May 27, 1941.   R. H. SALFISBERG   2,243,538
BELT CONVEYER
Filed Nov. 9, 1939   3 Sheets-Sheet 1
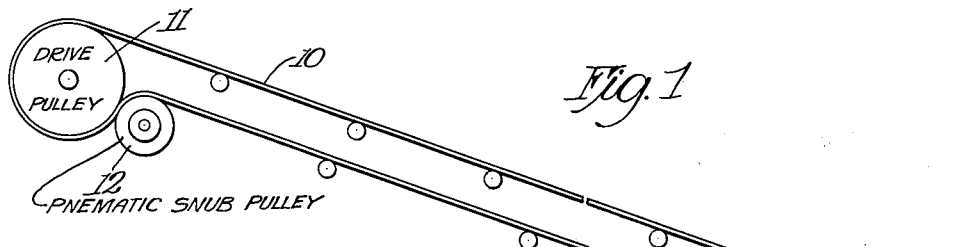
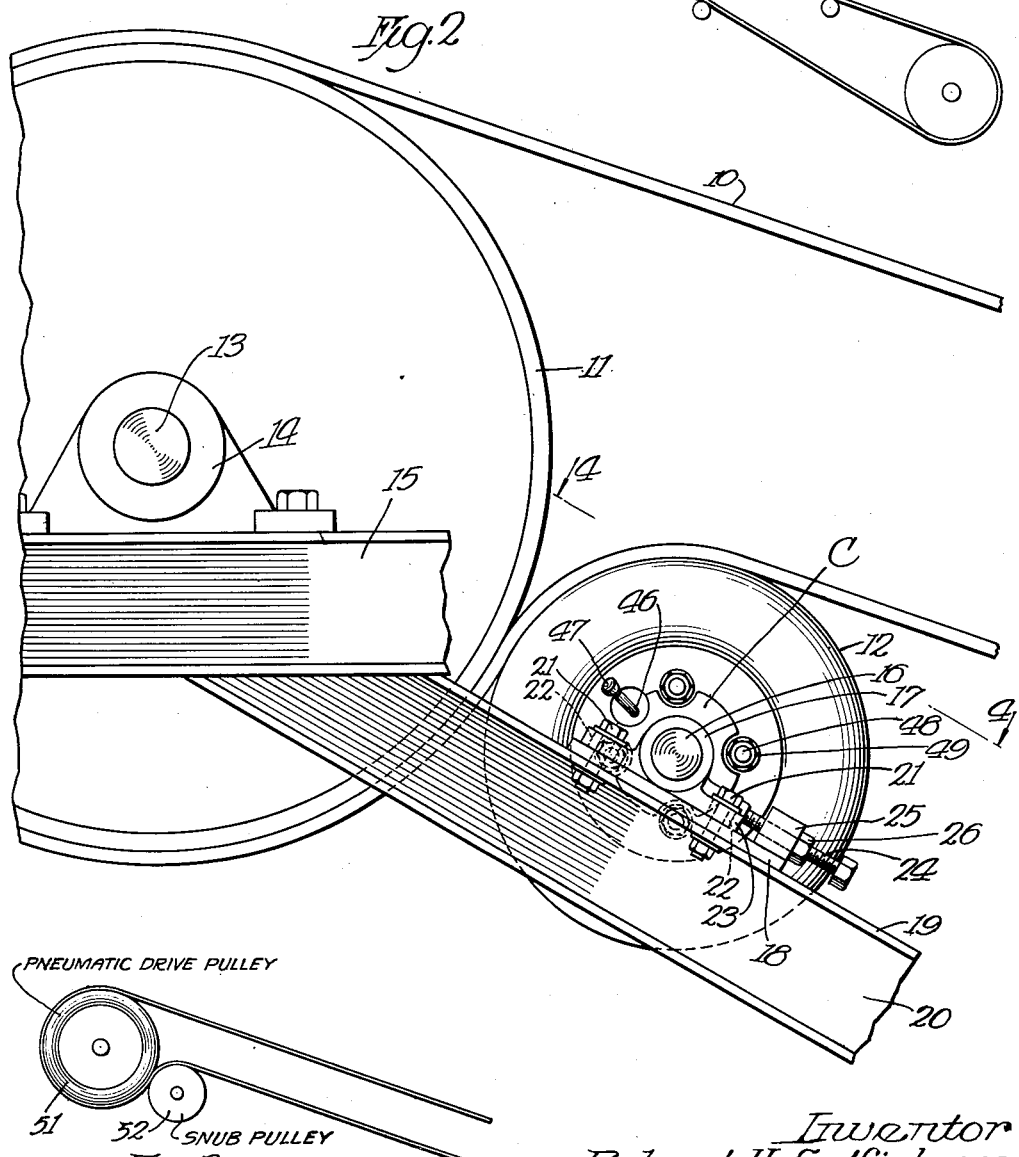

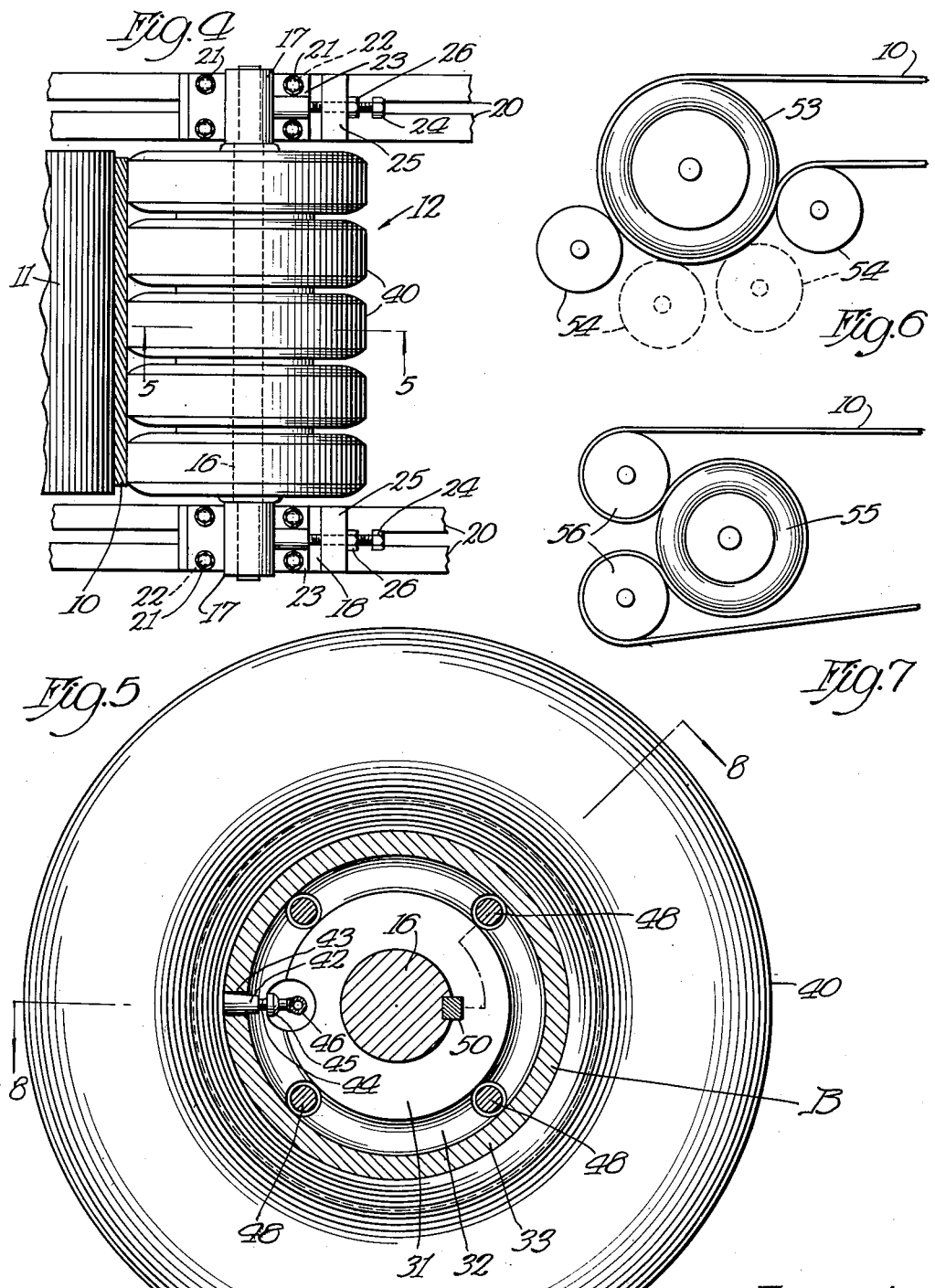

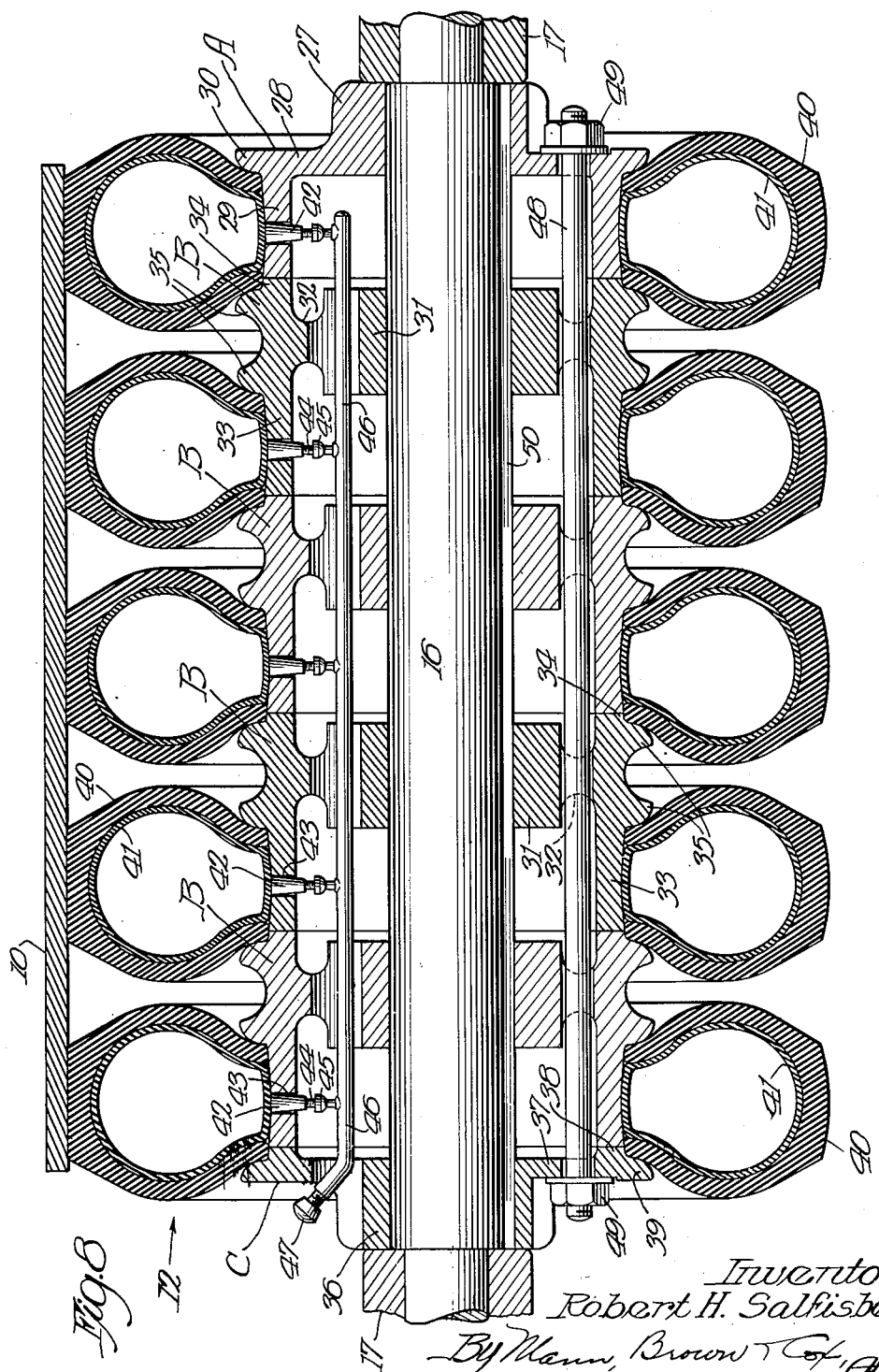

Patented May 27, 1941

2,243,538

UNITED STATES PATENT OFFICE 2,243,538

BELT CONVEYER

Robert H. Salfisberg, Aurora, Ill., assignor to Stephens-Adamson Manufacturing Company, a corporation of Illinois Application November 9, 1939, Serial No. 303,635

3 Claims. (Cl. 198—203)

The ordinary conveyer belt is made of a number of plies or layers of woven fabric impregnated with rubber and vulcanized together and the top and bottom of the belt are covered with an extra thickness of rubber.

The fabric is made in a variety of thicknesses and each thickness is usually identified by the weight per yd. 42" wide, such as 28 oz., 32 oz., 36 oz., 42 oz. and so on.

The strength of the belt is determined by the number and the weight of plies or layers of fabric in it. In practice, the basis for estimating the strength for durability and service is the allowable pull or tension in one layer of fabric one inch wide, commonly called "an inch ply." The following table gives the safe allowable tension for selected weights:

28 oz. fabric, 28 lbs. per inch ply
32 oz. fabric, 32 lbs. per inch ply
36 oz. fabric, 36 lbs. per inch ply
42 oz. fabric, 42 lbs. per inch ply
48 oz. fabric, 48 lbs. per inch ply A belt 30" wide having seven plies of 32 oz. fabric has 30x7 or 210 inch plies and at 32 lbs. per inch ply the maximum allowable tension in such a belt is 210x32 or 6720 lbs.

The total tension applied to a conveyer belt in use is made up of two factors, one, the pull transmitted from the drive pulley to the belt in order to do the actual work of conveying and elevating the load carried by the belt, and, another, the "initial" tension necessary to create friction between the belt and the drive pulley to effect the drive, which initial tension must remain applied when the conveyer is standing still and unloaded.

Casual water, ice, snow and such like reduce the coefficient of friction between the belt and the drive pulley. As a result, in practice, normal operation has been at excessive initial tension to prevent slipping when some abnormal condition reduced the coefficient of friction.

Every pound of the allowable tension for a given belt that goes into "initial tension" to create the driving friction is lost for conveying work. Hence, anything that will reduce the initial tension will increase the conveying ability of the conveyer without exceeding the maximum allowable tension in the belt.

The principal object of this invention is to provide pressure between the belt and the driving pulley independent of the tension in the belt and independent of the take-up device ordinarily used to regulate that tension.

Generally speaking, this is accomplished by pressing the belt against the drive pulley with a pneumatic pulley and regulating the pressure on the belt by changing the internal pressure of the pneumatic pulley. The best results so far have been obtained with a plurality of pneumatic tires on a common shaft having its axis in the same plane as the axis of the drive shaft and coupled together for inflation or deflation through a common valve. This enables the operator to vary the pressure easily, quickly and uniformly. He can make it just sufficient to prevent slippage when starting under load and can quickly increase it to offset a decrease in the coefficient of friction that may be caused by moisture, snow, ice and such like.

The tires accommodate themselves to the normal surface of the pulley and readily yield to pass lumps or cakes sticking to the belt. They permit the usual springs in the take-up device to be omitted at a considerable saving; although some engineers will prefer to include those springs, especially in long conveyers.

Of course the pneumatic tires can be used on the drive pulley and the pressure developed between it and one or more snub pulleys.

In the drawings:

Fig. 1 is a diagram of a belt conveyer driven by a head end drive pulley against which it is pressed by a pneumatic pressure pulley;

Fig. 2 is an enlarged side elevation of the head end of the conveyer showing the drive pulley and the pneumatic pressure pulley;

Fig. 3 is a diagram similar to Fig. 1, showing a belt conveyer flexed about a pneumatic drive pulley and pressed against a snub pulley;

Fig. 4 is a section taken on the line 4—4 of Fig. 2;

Fig. 5 is a section taken on the line 5—5 of Fig. 4;

Figs. 6 and 7 are diagrams similar to Fig. 3, showing other forms of drives;

Fig. 8 is an enlarged section taken on the line 8—8 of Fig. 5.

But these specific illustrations and the corresponding description are used for the purpose of disclosure only and are not intended to impose unnecessary limitations on the claims, for others will make a great variety of embodiments of the substance of the invention, all of which are intended to be covered by the claims.

In Figs. 1, 2 and 4, the conveyer belt 10 is flexed about a drive pulley 11 and pressed against it by a pneumatic pulley 12. The drive pulley is mounted on a shaft 13, journaled in bearings 14, on a frame 15. The pneumatic pressure pulley 12 is mounted on a shaft 16, journaled in bearings 17, adjustable along plates 18, secured to the flanges 19 of frame channels 20 by bolts 21. The openings 22 in the flanges 23 of the bearings are elongated to permit the bearings, and therefore the shaft 16, with the pulley 12, to be adjusted by the bolts 24 threaded into blocks 25 welded on the plates 18. When the adjustment is correct it is made secure by check nuts 26.

In Fig. 8 there is shown the form of pneumatic pulley 12 now preferred. It comprises disk wheel sections A, B, and C, there being one section A and C each and a plurality of sections B, depending upon the width of the belt. Each section A includes a hub 27, a web 28, a wide rim 29 and a flange 30. Each section B includes a hub 31, a web 32, a wide rim 33, a narrow rim 34 and two flanges 35. Each section C includes a hub 36, a web 37, a narrow rim 38 and a flange 39.

This particular embodiment designed for use with a 22" belt flexed over a 32" drive pulley, running 42 R. P. M., includes five 4.00-8 Goodyear tires, each of which includes a casing 40, and an inner tube 41, equipped with a hollow stem 42, which passes through an opening 43 in the corresponding rim portion 33. Each of the hollow stems is threaded externally at 44 to receive a nipple 45, by which it is connected with a common air pipe 46, fitted with a valve not shown, and a cap 47. By this means all of the tires may be inflated from one connection, or deflated by opening one valve and the pressure in all is maintained substantially uniform.

The several wheel sections are secured together by four bolts 48 passing through suitable openings in the web portions and fitted with nuts 49. They are all made to rotate with the shaft 16 by a common key 50.

In assembling the pressure pulley 12, the right tire in Fig. 8 is placed on the rim 29, the hollow stem connected to the pipe 46, then the wheel section B is slipped into place and the next tire to the left and so on, until the wheel section C has been mounted, when the bolts 49 are set up.

In assembling the conveyer, the tires will be deflated or at low pressure, when the pulley 12 is put in position, as shown at Fig. 2, and after the ends of the belt are connected, compressed air is supplied to the pipe 46 and the pressure made just sufficient to prevent slipping when the conveyer is started under load. After that the pressure is adjusted to and maintained at whatever is necessary to suit the friction conditions. The presence of ice, snow, moisture, oil and such other things that reduce the friction will call for an increase in pressure which is immediately distributed uniformly to the several tires. They will press against the outside of the belt and press it against the surface of the drive pulley. In doing so they spread out in a familiar manner and make the pressure uniform practically throughout the width of the belt. The gentle flexing of the tires in rotating against the belt has a sort of self-cleaning effect. Should a lump or a cake stick to the belt the tires will accommodate it much as a pneumatic tire accommodates a lump or bump on the road.

While it is preferable to have several tires rotate in unison and be connected to a common filling tube, they can, of course, be separately rotatable and independently inflatable.

In Fig. 3, the drive pulley 51 is made pneumatic, preferably by including in it a number of standard pneumatic tires, and the snub pulley 52 is not inflatable. Increasing the pressure in the pneumatic drive pulley will increase pressure between it and the snub pulley and offset a decrease in coefficient of friction.

In Fig. 6 the pneumatic drive pulley 53 cooperates with a plurality of rigid snub pulleys 54 between each of which and the drive pulley pressure is developed to increase the driving friction on the belt.

In Fig. 7, a pneumatic pulley 55 has a belt flexed about it and also about two adjacent snub pulleys 56, between each of which and the drive pulley the pressure is adjusted by adjusting the air pressure in the drive pulley.

By the use of a pneumatic pulley at the drive of a belt conveyer, the necessary pressure to create driving friction can be made suited to the conditions and varied as the conditions vary. At the same time the pressure will be distributed uniformly and extraneous matter clinging to the belt will not seriously interfere with the operation or cause damage to it.

Suitable embodiments are readily made for existing and new belt conveyers. They will increase the arc of contact when desired and will furnish and maintain with easy adjustment all the necessary driving friction without wasting tensile strength.

I claim as my invention:

1. Driving apparatus for a conveyer belt including a drive roll and a snubber pulley device for clamping the belt against the drive roll including shaft means, a plurality of rims mounted thereon and keyed to rotate together, a pneumatic tire for each rim, means for adjusting the shaft means at will toward and from the drive roll to provide a predetermined amount of indentation of the tire by the drive roll and the belt around the drive roll and for fixing the shaft means in the adjusted position, and a single valve and inflation means for all of the tires for controlling the total clamping pressure substantially without varying the position of the shaft means or the amount of said indentation.

2. In a belt conveyer, a drive pulley, a belt flexed about the drive pulley, a snub pulley clamping the belt against the drive pulley, and means rotatably mounting the snub pulley with its axis rigidly mounted with respect to the axis of the drive pulley; the snub pulley being pneumatic and having means for inflating the same whereby the clamping pressure may be changed while the axes remain constant so that the indentation of the pneumatic pulley adjacent the other pulley is substantially unchanged.

3. In a belt conveyer, a drive pulley, a belt flexed about the drive pulley, a snub pulley clamping the belt against the drive pulley, and means rotatably mounting the snub pulley with its axis rigidly mounted with respect to the axis of the drive pulley; one of the pulleys being pneumatic and having means for inflating the same whereby the clamping pressure may be changed while the axes remain constant so that the flexing of the pneumatic pulley adjacent the other pulley is substantially unchanged.

ROBERT H. SALFISBERG.